US008554999B2

(12) United States Patent
Natarajan

(10) Patent No.: US 8,554,999 B2
(45) Date of Patent: Oct. 8, 2013

(54) METHODS FOR PROVIDING A RESPONSE AND SYSTEMS THEREOF

(75) Inventor: Ravi Natarajan, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 13/481,217

(22) Filed: May 25, 2012

(65) Prior Publication Data

US 2013/0097383 A1 Apr. 18, 2013

Related U.S. Application Data

(63) Continuation of application No. 12/468,635, filed on May 19, 2009, now Pat. No. 8,301,837.

(51) Int. Cl.
*G06F 12/00* (2006.01)

(52) U.S. Cl.
USPC ........... 711/122; 711/103; 711/114; 711/113; 711/154

(58) Field of Classification Search
USPC .................................. 711/103, 114, 154, 122
See application file for complete search history.

(56) References Cited

U.S. PATENT DOCUMENTS

| | | | |
|---|---|---|---|
| 6,405,219 B2 | 6/2002 | Saether et al. | |
| 6,532,481 B1 | 3/2003 | Fassett, Jr. | |
| 6,640,240 B1 | 10/2003 | Hoffman et al. | |
| 6,772,203 B1 | 8/2004 | Feiertag et al. | |
| 6,772,225 B1 | 8/2004 | Jennings, III et al. | |
| 7,113,962 B1 | 9/2006 | Kee et al. | |
| 7,873,619 B1 | 1/2011 | Faibish et al. | |
| 2003/0004998 A1 | 1/2003 | Datta | |
| 2003/0023578 A1 | 1/2003 | Durand et al. | |
| 2003/0200283 A1 | 10/2003 | Suryanarayana et al. | |
| 2005/0114445 A1 | 5/2005 | Tracton et al. | |
| 2006/0015637 A1 | 1/2006 | Chung | |
| 2007/0104326 A1 | 5/2007 | Feigenbaum et al. | |
| 2008/0010243 A1* | 1/2008 | Weissman et al. ................ | 707/2 |

OTHER PUBLICATIONS

F5 Networks, Inc., "WebAccelerator Policy Management Guide", Version 5.1, pp. 1-254 (2005).
F5 Networks, Inc., "WebAccelerator Getting Started", Version 5.1, pp. 1-84 (2005).
F5 Networks, Inc., "WebAccelerator Administration Guide", Version 5.1, pp. 1-88 (2005).
F5 Networks, Inc., "Benefits of BIG-IP Application Optimization Over the WAN", pp. 1-6 (May 2005).
F5 Networks, Inc., "BIG-IP Network and System Management Guide", Version 9.3, pp. 1-406 (Apr. 19, 2007).
F5 Networks, Inc., "BIG-IP Local Traffic Manager: Implementations", Version 9.3, pp. 1-240 (May 1, 2007).
F5 Networks, Inc., "Platform Guide: WebAccelerator 4500", pp. 1-69 (May 24, 2007).

(Continued)

*Primary Examiner* — Thong Q Le
(74) *Attorney, Agent, or Firm* — LeClairRyan, a Professional Corporation

(57) ABSTRACT

A method, computer readable medium, and system for generating a response includes determining from which of a plurality of levels of cache to retrieve a response. The determination is based on a number of matches between current user session data associated with a current request and stored user session data rewritten into each of one or more metadata data variables for the response when a current request for the response matches at least one prior stored request for the response. The response from the determined level of the plurality of levels of cache is provided.

32 Claims, 3 Drawing Sheets

(56) References Cited

OTHER PUBLICATIONS

F5 Networks, Inc., "Administrator Guide for the BIG-IP WebAccelerator System", Version 9.4.2, pp. 1-112 (Sep. 13, 2007).
F5 Networks, Inc., "Policy Management Guide for the BIG-IP WebAccelerator System", Version 9.4.2., pp. 1-237 (Sep. 26, 2007).
F5 Networks, Inc., "BIG-IP Secure Access Manager", pp. 1-4 (2008).
F5 Networks, Inc., "BIG-IP Secure Access Manager Client Compatibility Matrix", Version 8.0, pp. 1-4 (Apr. 4, 2008).
F5 Networks, Inc., "BIG-IP Secure Access Manager Getting Started Guide", Version 8.0, pp. 1-80 (Apr. 18, 2008).
F5 Networks, Inc., "Platform Guide: 4300", pp. 1-107 (Jun. 18, 2008).
F5 Networks, Inc., "Configuration Guide for the BIG-IP WebAcceleerator System", Version 10.0.0, pp. 1-114 (Jan. 26, 2009).
F5 Networks, Inc., "Policy Management Guide for the BIG-IP WebAccelerator System", Version 10.0.0, pp. 1-228 (Jan. 27, 2009).
F5 Networks, Inc., "Configuration Guide for BIG-IP Local Traffic Management", Version 10.0.0, pp. 1-575 (Mar. 9, 2009).
U.S. Appl. No. 11/537,474, filed Sep. 29, 2006 for Transparently Cached Network Resources.

* cited by examiner

METHODS FOR PROVIDING A RESPONSE AND SYSTEMS THEREOF

This application is a continuation of U.S. patent application Ser. No. 12/468,635, filed May 19, 2009, now U.S. Pat. No. 8,301,837, which is hereby incorporated by reference in its entirety.

FIELD

This relates to methods, computer readable methods, computer readable media and systems for providing stored information and, more particularly, for methods, computer readable media and systems for providing a response to a request.

BACKGROUND

Many secure sockets layer/virtual private network (SSL/VPN) devices allow rewriting responses in response to requests using session data for end-user requests. The rewrite operation involves parsing the original response for abstract session variable names/function indicators and replacing them with customized values. Such rewrite techniques are typically process/system intensive and significantly degrade the system performance and throughput. Often it is not acceptable when the number of concurrent user sessions exceed a certain limit.

SUMMARY

A method for generating a response includes determining when a current request for a response matches at least one prior stored request for the response. When the current request is determined to match at least one prior stored request, determining from which of a plurality of levels of cache to retrieve the response based on a number of matches between current user session data associated with a current request and stored user session data in each of one or more sets of metadata data variables for the response. The response is provided from the determined level of the plurality of levels of cache.

A computer readable medium having stored thereon instructions for generating a response comprising machine executable code which when executed by at least one processor, causes the processor to perform steps comprising: determining when a current request for a response matches at least one prior stored request for the response. When the current request is determined to match at least one prior stored request, determining from which of a plurality of levels of cache to retrieve the response based on a number of matches between current user session data associated with a current request and stored user session data in each of one or more sets of metadata data variables for the response. The response is provided from the determined level of the plurality of levels of cache.

A network interface computing apparatus includes at least one memory storage system with a plurality of levels of cache and an interface processing system. The interface processing system determines when a current request for a response matches at least one prior stored request for the response. The interface processing system also determines from which of a plurality of levels of cache to retrieve the response based on a number of matches between current user session data associated with a current request and stored user session data in each of one or more sets of metadata data variables for the response when the current request is determined to match at least one prior stored request. Further, the interface processing system determines and provides the response from the determined level of the plurality of levels of cache.

These methods, computer readable media and systems provide a number of advantages including providing more effective and efficient methods, computer readable media and systems for providing a response or other information in response to a request. These methods, computer readable media and systems utilize efficient caching and retrieval techniques to speed up the generation of a requested response. Since these methods, computer readable media and systems significantly reduce the average processing time per request, they can support a large number of concurrent user sessions.

DETAILED DESCRIPTION

Figure 1A:
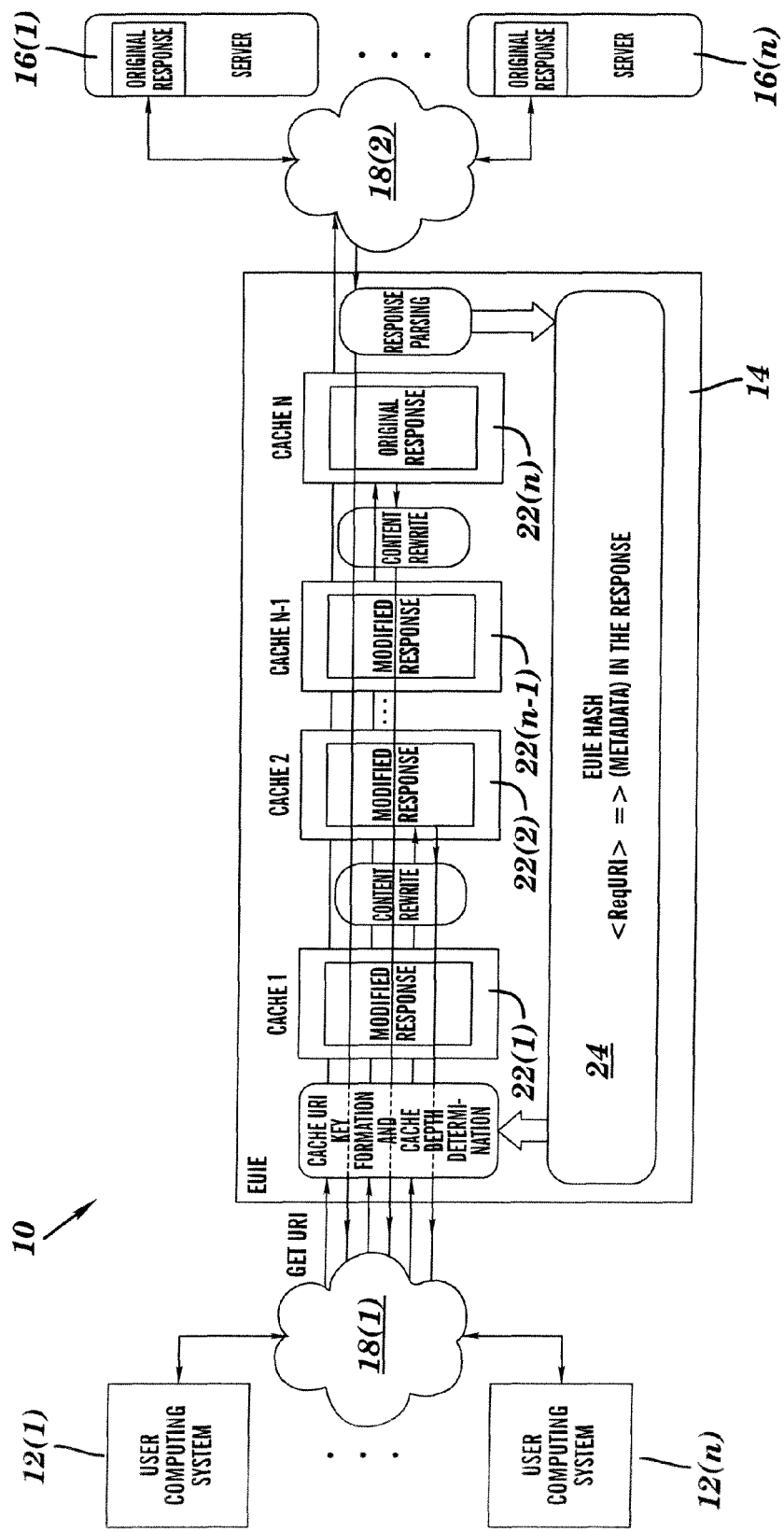
FIG. 1A is a partial block and partial functional diagram of a system for providing a response to a request.
Figure 1B:
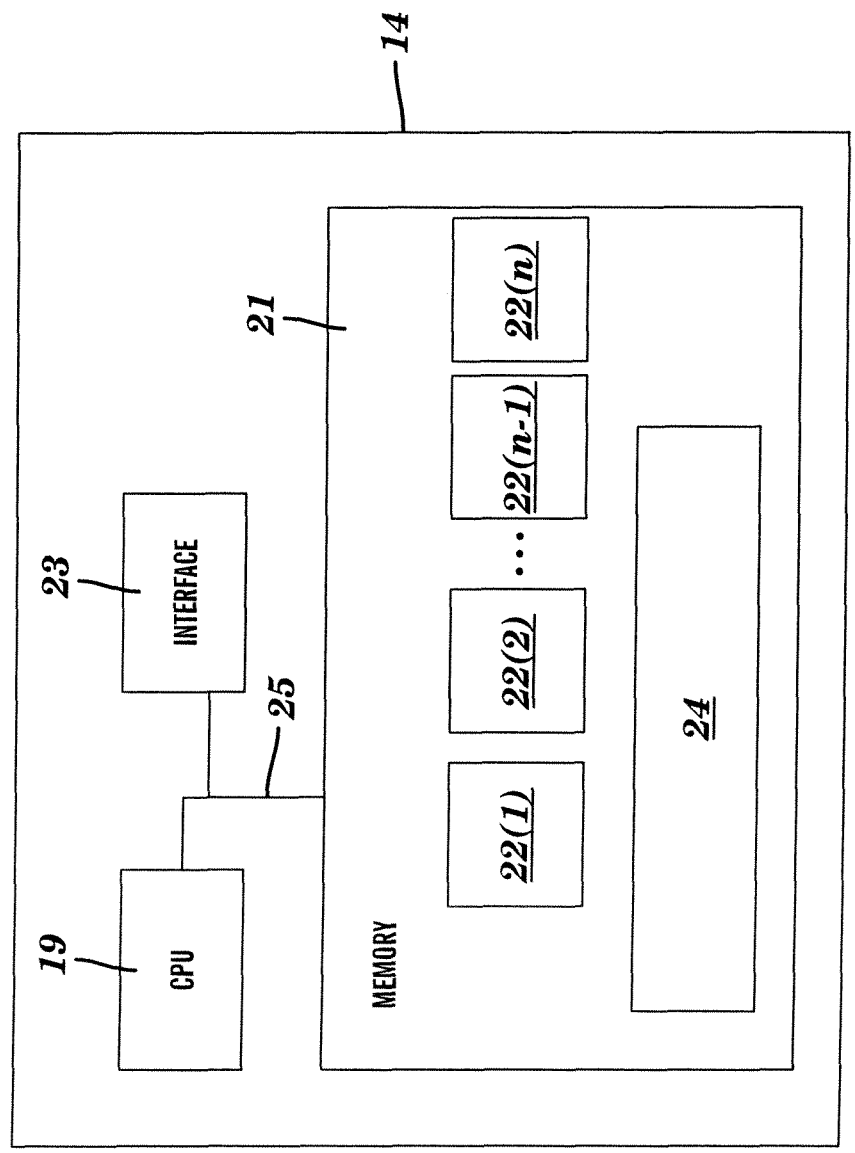
FIG. 1B is a block diagram of a network interface computing apparatus.

A system 10 for providing a response to a request is illustrated in FIGS. 1A and 1B. The system 10 includes user computer systems or apparatuses 12(1)-12(n), a network interface computing system or apparatus 14, and information provider server systems or apparatuses 16(1)-16(n) which are in communication with each over a communications network 18(1)-18(2), although the system 10 can comprise other numbers and types of entities, systems, apparatuses, devices, and components in other configurations. This method and system provides a number of advantages including providing more effective and efficient method and system for providing a response to a request.

Referring more specifically to FIG. 1A, each of the plurality of user computing systems 12(1)-12(n) enables a user to request and receive one or more responses and other information, although other numbers and types of systems could be used for other types and numbers of functions. In these exemplary embodiments illustrated and described herein, the response is a web page or page, although other types of responses can be used, such as images, documents, and other types of requested objects. Each of the user computing systems 12(1)-12(n) includes a central processing unit (CPU) or processor, a memory, user input device, a display, and a communication interface system, and which are coupled together by a bus or other link, although each of the user computing systems 12(1)-12(n) can include other numbers and types of components, parts, devices, systems, and elements in other configurations. The processor in each of the user computing systems 12(1)-12(n) executes a program of stored instructions for one or more aspects of this method as described and illustrated herein, although the processor could execute other numbers and types of programmed instructions.

The memory in each of the user computing systems 12(1)-12(n) stores these programmed instructions for one or more aspects of this method as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in each of the user computing systems 12(1)-12(n).

The user input device in each of the user computing systems 12(1)-12(n) is used to input selections, such as to input a request for a response, although the user input device could be used to input other types of data and actions and interact with other elements. The user input device can include a computer keyboard and a computer mouse, although other types and numbers of user input devices can be used, such as (but not limited to) a video game console controller, a mobile communications device keyboard, and a TV remote controller. The display in each of the user computing systems 12(1)-12(n) is used to show the input request and the resulting response, although other types and amounts of information can be displayed in other manners. The display can include a computer or mobile communications device display screen, such as a CRT or LCD screen, although other types and numbers of displays could be used.

The communication interface system in each of the user computing systems 12(1)-12(n) is used to operatively couple and communicate between each of the user computing systems 12(1)-12(n) and the network interface computing system 14, along with the information provider server systems 16(1)-16(n) via the communications networks 18(1)-18(2), although other types and numbers of communication networks or systems with other types and numbers of connections and configurations can be used. By way of example only, the communication networks 18(1) and 18(2) can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

Referring to FIGS. 1A-1B, the network interface computing system 14 manages requests for new responses and previously retrieved responses with different levels of metadata variables populated with user session data, although the network interface computing system 14 can provide other types and numbers of functions and other numbers and types and numbers of processing systems can be used. The network interface computing system 12 includes a processor 19, a memory 21 comprising a plurality of levels of cache 22(1)-22(n) and a hash storage device 24, and a communication interface system 23 which are coupled together by a bus 25 or other link, although other numbers and types of network entities and other numbers and types of the components in the computer systems can be used. The processor 19 executes a program of stored instructions for one or more aspects of this method as described herein, including for providing a response to a request. The memory 21 in the network interface computing system 12 stores these programmed instructions for one or more aspects of this method as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 19 can be used for the memory 23. The communication interface system 23 in the network interface computing system 14 is used to operatively couple and communicate between the network interface computing system 14 and the user computing systems 12(1)-12(n) along with the information provider server systems 16(1)-16(n) via the communications networks 18(1)-18(2), although other types and numbers of communication networks or systems with other types and numbers of connections and configurations can be used.

Referring to FIG. 1A, each of the information provider server systems 16(1)-16(n) receives and processes requests for one or more responses, such as home responses, financial information responses, educational responses, event/news responses, sports responses, company responses, product information responses and personal information responses by way of example only, although other numbers and types of systems and other numbers and types of pages, documents, images, and other requested objects can be provided. The responses provided by the information provider server systems 16(1)-16(n) contain one more metadata variables that can be populated with user session data, although the responses can have other formats. Each of the information provider server systems 16(1)-16(n) includes a central processing unit (CPU) or processor, a memory, and a communication interface system which are coupled together by a bus or other link, although other numbers and types of components, parts, devices, systems, and elements in other configurations and locations can be used. The processor in each of the information provider server systems 16(1)-16(n) executes a program of stored instructions for one or more aspects of this method as described and illustrated by way of the embodiments herein, although the processor could execute other numbers and types of programmed instructions.

The memory in each of the information provider server systems 16(1)-16(n) stores these programmed instructions for one or more aspects of the method, computer readable medium and system as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the information provider server systems 16(1)-16(n).

The communication interface system in each of the information provider server systems 16(1)-16(n) is used to operatively couple and communicate between the information provider server systems 16(1)-16(n) and the network interface computing system 14 along with the user computing systems 12(1)-12(n) via the communications networks 18(1)-18(2), although other types and numbers of communication networks or systems with other types and numbers of connections and configurations can be used.

Although embodiments of the system 10 with the user computing systems 12(1)-12(n), the network interface computing system 14, and the information provider server systems 16(1)-16(n) are described and illustrated herein, each of these systems can be implemented on any suitable computer system, device, component, circuit, or other network entity. It is to be understood that the systems of the embodiments described herein are for exemplary purposes, as many variations of the specific hardware and software used to implement the embodiments are possible, as will be appreciated by those skilled in the relevant art(s).

Furthermore, each of the systems or devices of the embodiments may by way of example be conveniently implemented using one or more general purpose computer systems, microprocessors, digital signal processors, micro-controllers, and application-specific integrated circuits programmed according to the teachings of the embodiments, as described and illustrated herein, and as will be appreciated by those ordinary skill in the art.

In addition, two or more computing systems, devices, components, or circuits can be substituted for any one of the systems or other elements in any embodiment. Accordingly, principles and advantages of distributed processing, such as redundancy and replication also can be implemented, as desired, to increase the robustness and performance of the devices and systems of the embodiments. The embodiments may also be implemented on computer system, systems or other devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the method as described and illustrated by way of the embodiments herein, as described herein, which when executed by a processor, cause the processor to carry out the steps necessary to implement the methods of the embodiments, as described and illustrated herein.

Figure 2:
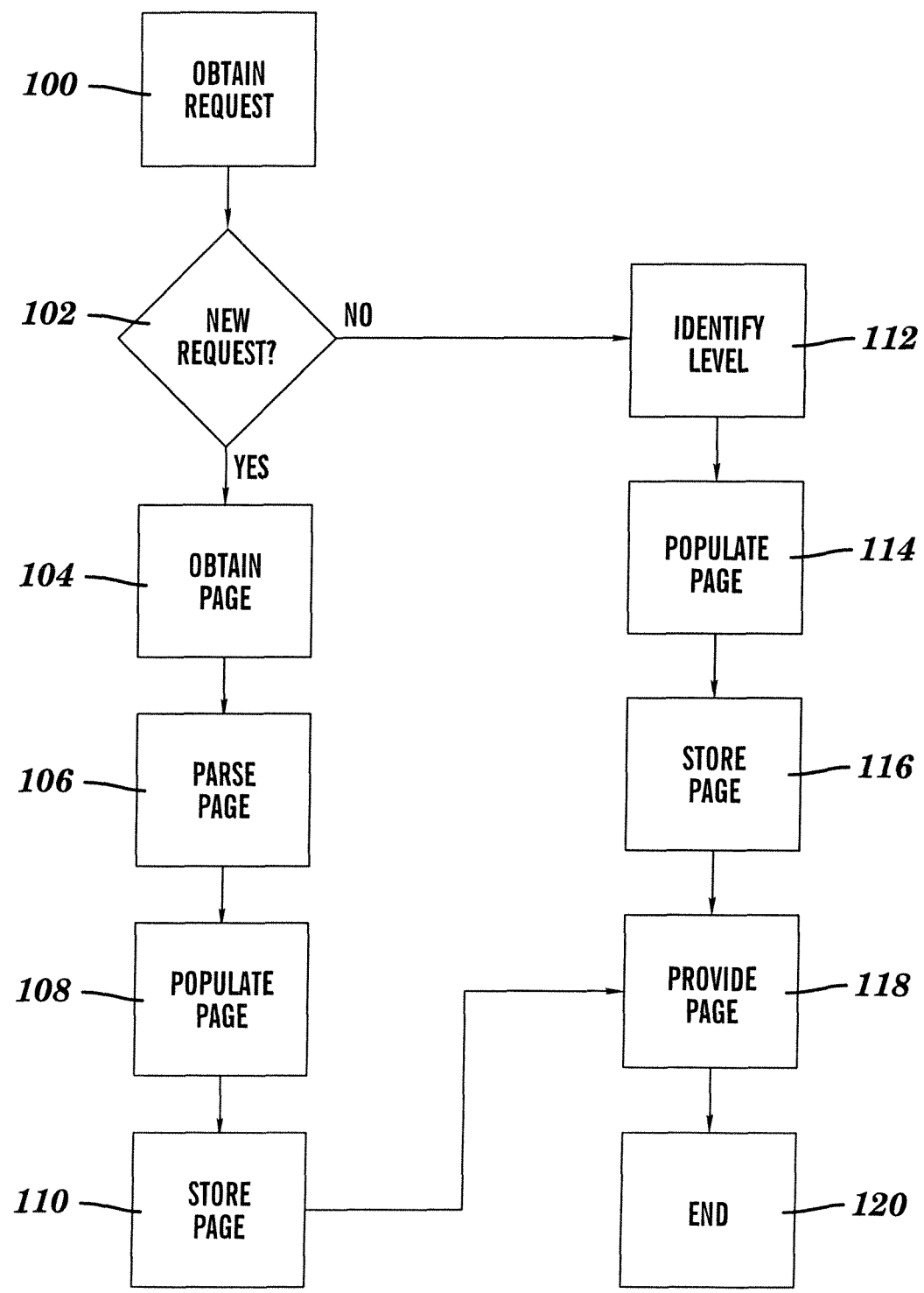
FIG. 2 is a flowchart of a method for providing a response to a request.

An exemplary method for providing a response to a request will now be described with reference to FIGS. 1A-2. In step 100, one of the user computing systems 12(1)-12($n$) provides a request for a response to the network interface computing system 14, although the network interface computing system 14 can obtain the request for a response from other systems and devices in other manners. The request includes user session data associated with the user at the one of the user computing system 12(1)-12($n$) that provided the request.

In step 102, the network interface computing system 14 determines whether the received request for the response from one of the user computing system 12(1)-12($n$) is a new request, i.e. has not been previously received and currently is not stored in the plurality of levels of cache 22(1)-22($n$) in the network interface computing system 14. If in step 102, the network interface computing system 14 determines the received request for the response from one of the user computing system 12(1)-12($n$) is a new request, then the Yes branch is taken to step 104.

In step 104, the request is transmitted by the network interface computing system 14 to the corresponding one of the one or more information provider server systems 16(1)-16($n$) which has stored the original response or other information responsive to the request, although the response or other information can be obtained in other manners. The corresponding one of the one or more information provider server systems 16(1)-16($n$) with the stored original response provides the requested response back to the network interface computing system 14.

In step 106, the network interface computing system 14 parses the obtained requested response to identify metadata variables, although the metadata variables in the obtained requested response could be identified in other manners. By way of example, since metadata variables have a specific pattern, the network interface computing system 14 uses regular expression pattern matching to parse the obtained requested responses and identify the metadata variables, although other manners for parsing the response can be used. Additionally, the network interface computing system 14 classifies the metadata variables into one or more groups, classes or sets based on one or more characteristics or aspects, although the identified metadata variables could remain separate. By way of example only, the network interface computing system 14 classifies the metadata variables relating to user connection settings at the SSL (Secure Socket Layer) level in one group, the metadata variables relating to user authentication information, such as username, password, and group information, into another group, and the metadata variables relating to settings, such as firewall and antivirus, on the one of the user computing system 12(1)-12($n$) that provided the request into yet another group, although the metadata variables can be classified into other types and numbers of groups, classes, or sets based on other characteristics or aspects. This classification by the network interface computing system 14 also is used to identify the different levels of cache 22(1)-22($n$) and generate a tree structure to assign an order for how many of these groups, classes or sets are populated or otherwise rewritten with content for each of the different levels of cache 22(1)-22($n$), although other manners for determining the assignment to the different levels of cache 22(1)-22($n$) can be used. Additionally, in this example the network interface computing system 14 assigns the first level of cache 22(1) all of the groups, classes or sets of metadata variables to be populated with content, the next level of cache 22(2) is assigned one less of the groups, classes or sets of metadata variables to be populated with content, the second last level of cache 22($n$-1) is assigned only one of the groups, classes or sets of metadata variables to be populated with content, and the last level of cache 22($n$) has none of the groups, classes or sets of metadata variables assigned to be populated with content.

In step 108, the network interface computing system 14 populates or otherwise rewrites the response with the user session data from the request corresponding with each of the metadata data variables in each of the one or more identified classes or sets for cache 22(1). The network interface computing system 14 also populates or otherwise rewrites the response with the user session data from the request corresponding with each of the metadata data variables in one fewer of the one or more identified classes for each of the subsequent plurality levels of cache 22(2)-22($n$) in accordance with the determined order, although other manners for populating or otherwise rewriting the response for the plurality of levels of cache 22(1)-22($n$) can be used.

In step 110, the network interface computing system 14 stores each of the populated or otherwise rewritten responses in the corresponding one of the plurality of levels of cache 22(1)-22($n$), although the populated or otherwise rewritten responses could be stored in other locations. When the plurality of levels of cache 22(1)-22($n$) have reached their storage capacity or a set threshold, the network interface computing system 14 clears one or more previously requested and stored responses by determining which of these responses has been used the least most recently and then deletes one or more of those identified responses, although other manners for clearing the plurality of levels of cache 22(1)-22($n$) based on other factors can be used. Meanwhile, if back in step 102, the network interface computing system 14 determined the received request for the response from one of the user computing system 12(1)-12($n$) is not a new request, then the No branch is taken to step 112.

In step 112, the network interface computing system 14 determines a number of matches between the current user session data associated with a current request and stored user session data in each of one or more classes or sets of metadata variables for the response, although other manners for determining a match can be used. Based on the determined number of matches, the network interface computing system 14 determines from which of a plurality of levels of cache 22(1)-22(n) in the network interface computing system 14 to retrieve the response. For example, if there was a complete match between the current user session data associated with a current request and stored user session data, then the network interface computing system 14 would retrieve the response from cache 22(1). In another example, if only one of the one or more classes or sets of metadata variables had a match, then the network interface computing system 14 would retrieve the response from cache 22(n−1).

In step 114, the network interface computing system 14 populates or otherwise rewrites the response with the current user session data from the current request corresponding with each of the metadata data variables in each of the one or more identified classes or sets for cache 22(1). The network interface computing system 14 also populates or otherwise rewrites the response with the current user session data from the request corresponding with each of the metadata data variables in one fewer of the one or more identified classes for each of the subsequent plurality levels of cache 22(2)-22(n) in accordance with the determined order, although other manners for populating or otherwise rewriting the response for the plurality of levels of cache 22(1)-22(n) can be used.

In step 116, each of the populated or otherwise rewritten responses associated with the current request is stored in the corresponding one of the plurality of levels of cache 22(1)-22(n) for future retrieval up to the memory capacity of the network interface computing system 14, although the populated or otherwise rewritten responses could be stored in other locations.

Meanwhile in step 118, the network interface computing system 14 provides the requested response which is completely populated with the user session data associated with the current request to the one of the user computing system 12(1)-12(n) which submitted the request.

Accordingly, a more effective and efficient method, computer readable medium and system for providing a response to a request is disclosed herein. This method, computer readable medium and system utilizes efficient caching and retrieval techniques to speed up the generation of the requested response. Since this method, computer readable medium and system significantly reduces the average processing time per request, it can support a large number of concurrent user sessions.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing a response, the method comprising:
   receiving, at a network interface computing apparatus, a request for a response received from a user computing apparatus;
   determining, with the network interface computing apparatus, whether the request matches at least one prior stored request;
   retrieving, with the network interface computing apparatus, the response from an information provider apparatus when it is determined that the request does not match at least one prior stored request;
   parsing, with the network interface computing apparatus, the response to identify one or more metadata variables for the response;
   rewriting, with the network interface computing apparatus, the response for each of a plurality of levels of cache assigned a different set of metadata variables, each rewritten response including user session data associated with the request for one or more of the identified metadata variables, the one or more of the identified metadata variables included in the set of metadata variables assigned to each of the plurality of levels of cache; and
   storing, with the network interface computing apparatus, each of the rewritten response in a corresponding one of the plurality of levels of cache.

2. The method as set forth in claim 1, further comprising storing, with the network interface computing apparatus, the request for the response in each of the plurality of levels of cache.

3. The method as set forth in claim 1, further comprising obtaining, with the network interface computing apparatus, the user session data in response to the current request.

4. The method as set forth in claim 1, wherein the set of metadata variables assigned to a each subsequent one of the plurality of levels of cache comprises at least one fewer metadata variable.

5. The method as set forth in claim 1, further comprising:
   identifying, with the network interface computing apparatus, one of the plurality of levels of cache based on a number of matches between user session data associated with the request and stored user session data in one or more metadata data variables for the response when it is determined that the request matches at least one prior stored request; and
   providing, with the network interface computing apparatus, the response to the one user computing apparatus from the identified level of cache.

6. The method as set forth in claim 5, further comprising:
   identifying, with the network interface computing apparatus, in the response from the identified level of cache any of the metadata variables with stored user session data without a match to a corresponding portion of the user session data; and
   replacing, with the network interface computing apparatus, the stored user session data in any of the metadata variables without a match with the corresponding portion of the current user session data.

7. A non-transitory computer readable medium having stored thereon instructions for providing a response comprising machine executable code which when executed by at least one processor, causes the processor to perform steps comprising:
   receiving a request for a response received from a user computing apparatus;
   determining whether the request matches at least one prior stored request;
   retrieving the response from an information provider apparatus when it is determined that the request does not match at least one prior stored request;

parsing the response to identify one or more metadata variables for the response;

rewriting the response for each of a plurality of levels of cache assigned a different set of metadata variables, each rewritten response including user session data associated with the request for one or more of the identified metadata variables, the one or more of the identified metadata variables included in the set of metadata variables assigned to each of the plurality of levels of cache; and storing each of the rewritten response in a corresponding one of the plurality of levels of cache.

8. The medium as set forth in claim 7, wherein the instructions when executed by the processor cause the processor to perform steps further comprising storing the request for the response in each of the plurality of levels of cache.

9. The medium as set forth in claim 7, wherein the instructions when executed by the processor cause the processor to perform steps further comprising obtaining the user session data in response to the current request.

10. The medium as set forth in claim 7, wherein the set of metadata variables assigned to a each subsequent one of the plurality of levels of cache comprises at least one fewer metadata variable.

11. The medium as set forth in claim 7, wherein the instructions when executed by the processor cause the processor to perform steps further comprising:
identifying one of the plurality of levels of cache based on a number of matches between user session data associated with the request and stored user session data in one or more metadata data variables for the response when it is determined that the request matches at least one prior stored request; and
providing the response to the one user computing apparatus from the identified level of cache.

12. The medium as set forth in claim 11, wherein the instructions when executed by the processor cause the processor to perform steps further comprising:
identifying in the response from the identified level of cache any of the metadata variables with stored user session data without a match to a corresponding portion of the user session data; and
replacing the stored user session data in any of the metadata variables without a match with the corresponding portion of the current user session data.

13. A network interface computing apparatus, comprising:
at least one memory storage system with a plurality of levels of cache, each level of cache assigned a different set of metadata variables; and
at least one processor configured to execute program instructions stored in the memory storage system comprising:
receiving a request for a response received from a user computing apparatus;
determining whether the request matches at least one prior stored request;
retrieving the response from an information provider apparatus when it is determined that the request does not match at least one prior stored request;
parsing the response to identify one or more metadata variables for the response;
rewriting the response for each of the plurality of levels of cache, each rewritten response including user session data associated with the request for one or more of the identified metadata variables, the one or more of the identified metadata variables included in the set of metadata variables assigned to each of the plurality of levels of cache; and
storing each of the rewritten response in a corresponding one of the plurality of levels of cache.

14. The apparatus as set forth in claim 13, wherein the processor is further configured to execute program instructions stored in the memory storage system further comprising storing the request for the response in each of the plurality of levels of cache.

15. The apparatus as set forth in claim 13, wherein the processor is further configured to execute program instructions stored in the memory storage system further comprising obtaining the current user session data in response to the current request.

16. The apparatus as set forth in claim 13, wherein the set of metadata variables assigned to a each subsequent one of the plurality of levels of cache comprises at least one fewer metadata variable.

17. The apparatus as set forth in claim 13, wherein the processor is further configured to execute program instructions stored in the memory storage system further comprising:
identifying one of the plurality of levels of cache based on a number of matches between user session data associated with the request and stored user session data in one or more metadata data variables for the response when it is determined that the request matches at least one prior stored request; and
providing the response to the one user computing apparatus from the identified level of cache.

18. The apparatus as set forth in claim 17, wherein the processor is further configured to execute program instructions stored in the memory storage system further comprising:
identifying in the response from the identified level of cache any of the metadata variables with stored user session data without a match to a corresponding portion of the user session data; and
replacing the stored user session data in any of the metadata variables without a match with the corresponding portion of the current user session data.

19. A system for providing a response, the system comprising:
a plurality of information provider server systems; and
a network interface computing apparatus comprising at least one memory storage system with a plurality of levels of cache, each level of cache assigned a different set of metadata variables, and at least one processor configured to execute program instructions stored in the memory storage system comprising:
receiving a request for a response received from a user computing apparatus;
determining whether the request matches at least one prior stored request;
retrieving the response from one of the information provider server systems when it is determined that the request does not match at least one prior stored request;
parsing the response to identify one or more metadata variables for the response;
rewriting the response for each of the plurality of levels of cache, each rewritten response including user session data associated with the request for one or more of the identified metadata variables, the one or more of the identified metadata variables included in the set of metadata variables assigned to each of the plurality of levels of cache; and storing each of the rewritten response in a corresponding one of the plurality of levels of cache.

20. The system as set forth in claim 19, wherein the processor is further configured to execute program instructions stored in the memory storage system further comprising storing the request for the response in each of the plurality of levels of cache.

21. The system as set forth in claim 19, wherein the processor is further configured to execute program instructions stored in the memory storage system further comprising obtaining the current user session data in response to the current request.

22. The system as set forth in claim 19, wherein the set of metadata variables assigned to a each subsequent one of the plurality of levels of cache comprises at least one fewer metadata variable.

23. The system as set forth in claim 19, wherein the processor is further configured to execute program instructions stored in the memory storage system further comprising:

identifying one of the plurality of levels of cache based on a number of matches between user session data associated with the request and stored user session data in one or more metadata data variables for the response when it is determined that the request matches at least one prior stored request; and providing the response to the one user computing apparatus from the identified level of cache.

24. The system as set forth in claim 23, wherein the processor is further configured to execute program instructions stored in the memory storage system further comprising:

identifying in the response from the identified level of cache any of the metadata variables with stored user session data without a match to a corresponding portion of the user session data; and replacing the stored user session data in any of the metadata variables without a match with the corresponding portion of the current user session data.

25. A system for generating a response, the system comprising:

a plurality of user computing systems; and a network interface computing apparatus comprising at least one memory storage system with a plurality of levels of cache and at least one processor configured to execute program instructions stored in the memory storage system comprising:

determining when a current request for a response received from one of the plurality of user computing systems matches at least one prior stored request for the response;

determining from which of the plurality of levels of cache to retrieve the response based on a number of matches between current user session data associated with the current request and stored user session data in each of one or more sets of metadata data variables for the response when the current request is determined to match at least one prior stored request; and providing the response from the determined level of the plurality of levels of cache to the one user computing system.

26. The system as set forth in claim 25 wherein the processor is further configured to execute program instructions stored in the memory storage system further comprising:

identifying in the response from the determined level of the plurality of levels of cache any of the sets of one or more metadata variables with stored user session data without a match to a corresponding portion of the current user session data; and replacing the stored user session data in any of the sets of one or more metadata variables without the match with the corresponding portion of the current user session data.

27. The system as set forth in claim 26 wherein the processor is further configured to execute program instructions stored in the memory storage system further comprising:

rewriting the response for the first of the plurality of levels of cache by populating the current user session data in the corresponding one or more metadata variables in each of the sets and rewrites the response for each of the subsequent plurality of levels of cache by populating the current user session data in the corresponding one or more metadata variables in one less of the sets and wherein the at least one memory storage system with the plurality of levels of cache; and storing each of the one or more rewritten responses in the corresponding one of the plurality of levels of cache.

28. The system as set forth in claim 25 wherein the processor is further configured to execute program instructions stored in the memory storage system further comprising retrieving the response from one of a plurality of information provider computing systems when the current request is a new request for the response.

29. The system as set forth in claim 28 wherein the processor is further configured to execute program instructions stored in the memory storage system further comprising;

parsing the response retrieved for the new request to identify the one or more metadata data variables for the response; and classifying the identified one or more metadata data variables for the response into the one or more sets of metadata variables for the response.

30. The system as set forth in claim 29 wherein the processor is further configured to execute program instructions stored in the memory storage system further comprising:

rewriting the response in each of the plurality of levels of cache, wherein the rewritten response in a first one of the plurality levels of cache has stored user session data from the new request written in each of the one or more metadata data variables in each of the sets and the rewritten response in each of the subsequent plurality levels of cache has the current user session data rewritten in the one or more metadata data variables in one fewer of the sets; and storing the rewritten response in each of the plurality of levels of cache.

31. The system as set forth in claim 30 wherein processor is further configured to execute program instructions stored in the memory storage system further comprising storing the new request for the rewritten response in each of the plurality of levels of cache.

32. The system as set forth in claim 31 wherein the processor is further configured to execute program instructions stored in the memory storage system further comprising obtaining the current user session data in response to the current request.

* * * * *